May 17, 1960 G. L. MATTHAEI ET AL 2,937,347

FILTER

Filed Jan. 2, 1958

George L. Matthaei
Conrad F. Eaton
INVENTOR.

BY Albert Rosen
Morris Spector
Attorneys.

2,937,347

FILTER

George L. Matthaei, Inglewood, and Conrad F. Eaton, El Segundo, Calif., assignors, by mesne assignments, to Thompson Ramo Wooldridge Inc., Cleveland, Ohio, a corporation of Ohio Application January 2, 1958, Serial No. 706,695

2 Claims. (Cl. 333—73)

This invention relates to improvements in the electromagnetic filter art and, in particular, to improvements in band pass microwave filters, that is, filters adapted to pass a band of frequencies and to block frequencies above and below this band.

Band pass microwave filters are known wherein the size of the resonators or active filter elements are an appreciable fraction (for example one-half) of the wave length of the signal wave to be subjected to filtering.

However, such filters have not proven entirely satisfactory due to their large sizes, high losses, or difficulty of manufacture as a result of high tolerance requirements. For example, two of the more important types of band pass microwave filters are the wave guide filter and the printed circuit, strip transmission line filter. The wave guide filter realizes relatively high efficiency at the expense of relatively bulky filter dimensions while the printed circuit filter realizes compactness at the expense of reduced efficiency.

In a wave guide microwave filter the lowest frequency that can be passed by the filter is limited by one or more of the cross-sectional dimensions of the wave guide portion. Consequently, wave guide filters for the commonly used microwave frequencies are necessarily relatively bulky. In a printed circuit microwave filter a relatively low efficiency is realized as a consequence of the relatively small area of the conducting surfaces in the filter, and of losses resulting from the presence of dielectric support material adjacent to regions of relatively high electric field strength. Also, a microwave filter of this type often requires fabrication tolerances that are difficult to realize by printed circuit techniques.

Accordingly, one of the objects of this invention is to provide an improved compact filter that exhibits relatively low losses.

A further object is to provide an improved microwave filter of a type wherein the required mechanical tolerances are easily realized.

Yet another object is the provision of an improved, compact, microwave filter arrangement that lends itself to use in filters having either relatively narrow band widths (for example, a band width of 1 percent of the center frequency of the filter pass band) or relatively wide band widths (for example, a band width of 25 percent of the center frequency of the pass band).

The foregoing and related objects are realized in a low cost, compact microwave filter according to the invention. The filter is made up of one or more resonator elements capacitively coupled to each other and to adjacent circuits. Each of the filter elements is comprised of a pair of spaced-apart ground members with a substantially half wave length resonator assembly sandwiched between and spaced from the ground members. The resonator assembly includes a central conductor mounted on a dielectric support member and positioned adjacent to (but spaced from) the ground members. The filter is free of dielectric support material in regions between the conductor and ground members.

In one embodiment of the invention, the ground members of each of the filter elements take the form of a pair of elongated, substantially parallel metal plates with the plates of adjacent elements integral with each other. The resonator assembly of each filter element is comprised of an elongated metal bar mounted on a dielectric support plate positioned between the ground plates, the bar having an effective length substantially equal to half of the center frequency wave length of the filter pass-band and being supported between the ground plates. In one form of the invention the filter is made up of a number of filter elements with the bars of adjacent filter elements spaced apart from each other and arranged in end-to-end relationship to provide the capacitive coupling referred to.

In the drawing, wherein like reference characters refer to like parts:

Figure 1:
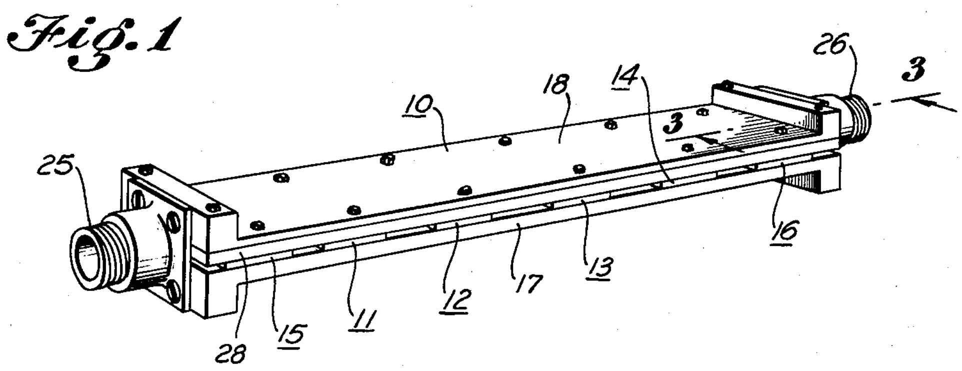
Figure 1 is a perspective view of a microwave filter according to the invention.
Figure 2:
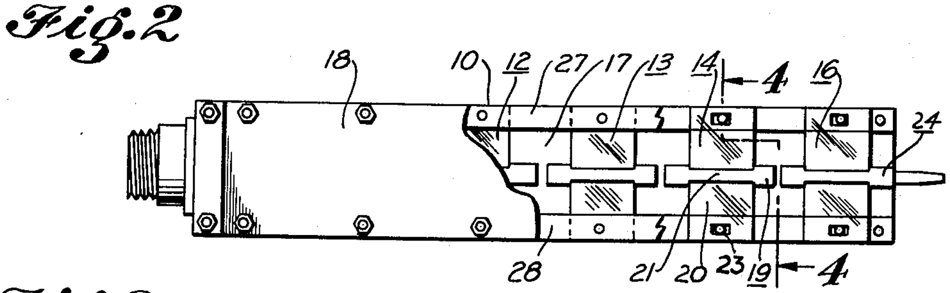
Figure 2 is a partially broken away plan view of the filter of Figure 1.

The filter of the invention will be described in connection with Figures 1 to 5 as embodied in a strip form transmission line filter 10 having four resonator elements 11 to 14 coupled in cascade or series. Input and output elements 15 and 16 are coupled to opposite ends of the series of resonator elements 11 to 14 for passing microwave energy into and out of the filter 10. The microwave filter 10 described by way of example is adapted to be coupled to a coaxial transmission line (not shown) by means of input and output coaxial line connectors 25 and 26.

Each of the four resonator or filter elements 11 to 14 is made up of a resonator assembly 19 (Figure 4), including a resonator bar 21, sandwiched between adjacent portions of two elongated, generally flat, metallic ground members 17 and 18. The ground members 17 and 18 may be considered to collectively form an outer ground return circuit, and the resonator bars 21 to collectively form the inner conductor of the circuit.

Figure 3:
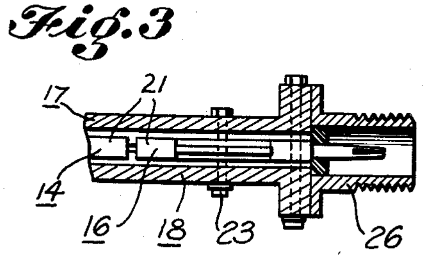
Figure 3 is a sectional view taken on line 3—3 of Figure 1.
Figure 4:
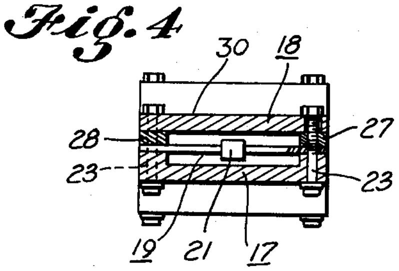
Figure 4 is a sectional view taken on line 4—4 of Figure 2.
Figure 5:
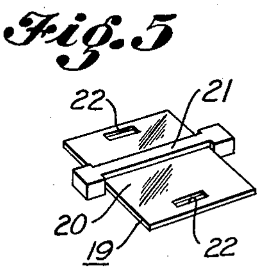
Figure 5 is a perspective view of one of the resonator assemblies of the filter of Figure 1.

As shown in Figure 5, each of the resonator assemblies 19 (and the input and output element assemblies 24 illustrated in Figure 4) is made up of the bar-like conductor 21, which is of a conductive material such as copper, mounted on a dielectric support plate 20. The support plate 20 positions each of the conductors or bars 21 symmetrically between, substantially parallel to, and spaced apart from the two metal ground members 17 and 18 referred to. As shown in Figure 3, the conductive bars 21 are disposed in end-to-end relationship. Each of the conductive bars 21 has an actual length equal to a little less than one-half wave length of the mid-frequency band pass wave length. The end-to-end arrangement referred to provides a series capacitive coupling between adjacent filter elements and between the end filter elements 11 and 14 and the input and output elements 15 and 16.

Referring to Figure 5, each of the support plates 20 is preferably made of a rigid, low-loss dielectric material such as a reinforced laminate of cross-linked styrene copolymer (for example, a material known in the trade as Rexolite) or of a glass reinforced tetrafluoroethylene (for example, a material known in the trade as Fiberglas-Teflon). Each of the support plates 20 is provided with apertures 22. Bolts 23 (Figures 2 to 4) are passed through these apertures for securing the ground members 17 and 18 to each other and for clamping the support plates 20 between the ground members. The apertures 22 have a larger cross-sectional dimension than that of the bolts 23 in order to permit leeway for adjustment of the relative position of the support plates 20, and thus of the bars 21, after assembly of the plates between the ground members 17 and 18.

According to one feature of the invention, filter losses are greatly reduced by the substantial reduction of dielectric losses (that is, losses due to alternating electric fields in a dielectric material). This substantial reduction of dielectric losses is realized by filter construction aspects according to the invention which assure that very little electric field energy passes through the dielectric support plates 20. The dielectric support plates 20 are each made substantially shorter than the bar 21 mounted on it so that no dielectric material is present adjacent to the ends of the bars where regions of high electric fields are present during operation of the filter. Then, too, the regions of the filter between the bars 21 and the ground members are free of dielectric support material.

The distance between each of the ground members and the bar surface facing it is less than the distance between a support plate 20 and the ground member. The foregoing is realized by constructing the bars 21 thicker than the support plates 20. Also, the end portions of each of the bars 21 are made a little wider (in directions parallel to the planes of the ground members and normal to the directions of extension of the bars) than other portions of the bars in order to substantially eliminate reflections that would be generated by the presence of dielectric support material.

In the fabrication of a filter according to the invention each of the resonator assemblies 19 and input and output assemblies 24 are first separately assembled, and then adjacent assemblies are successively mounted between the ground members 17 and 18. In mounting the assemblies between the ground members a feeler gauge or similar measuring instrument is used to set the spacing between adjacent assemblies as each assembly is mounted; by this means predetermined gap spacings may be accurately established in the filter during its assembly.

In order to more easily position the resonator assemblies 19 and input and output assemblies 24 during assembly of the filter one of the ground members 18 (Figure 4) is preferably made in three sections, the sections comprising a generally flat portion 30 and two strip-like portions 27 and 28. The strip-like portions 27 and 28 may each be threaded to receive the bolts 23 so that the bars 21 may be desirably positioned relative to each other (by movement of the support plates 20 relative to the strip-like portions 27 and 28). The strip-like portions 27 and 28 are flexible so as to permit the positioning of one assembly after an adjacent assembly has been locked in place. After all of the assemblies have been desirably positioned the flat portion 30 of the upper ground plate 18 is bolted to the structure or sub-assembly thus formed and the coaxial line connectors 25 and 26 are bolted to end portions of the ground members 17 and 18, completing the assembly of the filter. While the filter of the invention has been described as having its components bolted together after being desirably positioned relative to each other in order to allow for a fine adjustment of the gap capacities, it is to be realized that the assemblies may instead be cemented or otherwise fixed in place after being relatively positioned.

A filter embodying the invention can be constructed to exhibit either a relatively small pass-band width (for example, with pass band having a width of about one percent of the center frequency of the filter) or a relatively large pass-band width (for example, with a pass band having a width of about 25 percent of the center frequency of the filter). The minimum pass-band width is limited by the filter losses, but since the losses of filters embodying the invention are relatively low for a given cross sectional size, relatively narrow pass-band filters are feasible. The maximum band width for a given center frequency is determined by the magnitude of the capacitance that can be realized in the gaps between adjacent center bars 21. Since the end portions of the bars (the portions of the bars defining the gaps) can be constructed with a relatively large cross sectional area, relatively large gap capacities (and consequent large band widths) can be realized without a change in the form of filter construction according to the invention.

While the filter illustrated in Figures 1 to 5 has four resonator assemblies 19, it will be appreciated that a lesser or greater number of resonator assemblies may instead be used. For example, one filter constructed in accordance with the invention (the performance of which is illustrated in Figure 6) had five resonator assemblies.

Figure 6:
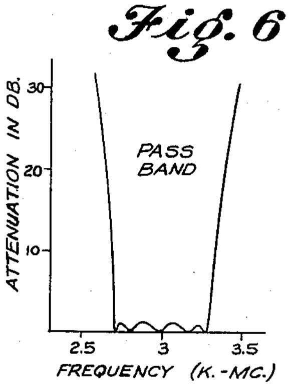
Figure 6 is a graphical illustration of a performance characteristic of a filter according to the invention.

Figure 6 is a graph illustrating the results realized in one filter constructed in accordance with the invention. It will be noted that the filter tested, which had five resonator assemblies, had a pass band with a center frequency of 3000 megacycles and a band width of about 20 percent. While frequencies between about 2.7 and 3.3 kilomegacycles were passed with a maximum of about one decibel attenuation, frequencies of less than 2.6 and more than 3.4 kilomegacycles were subjected to over 25 decibels attenuation. Thus, frequencies as close as .1 kilomegacycle to the pass band were highly attenuated. Of course, even greater attenuation is realized for frequencies further than .1 kilomegacycle from the pass band.

From the foregoing it is realized that an improved low loss, compact filter is provided that is especially useful in microwave transmission lines.

What is claimed is:

1. A wide band-pass filter comprising: two elongated, substantially parallel, generally flat, spaced apart ground portions; and a plurality of substantially one-half wavelength resonator assemblies positioned between said portions, each of said assemblies including a bar-like conductor having a substantially planar face adjacent to, and spaced from, a substantially planar face of an adjacent conductor to provide lumped capacitive coupling with the spacing therebetween determining the efficiency of the filter; a plurality of plates of dielectric support material, one of each secured to each one of said conductors; and said pairs being spaced apart from and oriented substantially parallel to each of said portions, each of said plates defining slot apertures near the lateral extremities of each plate with each aperture in each plate having a minor dimension suitable for encompassing a bolt for maintaining each plate in lateral position and a major dimension substantially greater than said minor dimension thereby facilitating longitudinal adjustment of each plate and assembly with the bolt in position; the filter being free of dielectric support material in regions between each of said conductors and said portions and in regions between said adjacent planar faces.

2. A wide band-pass filter comprising: two elongated, substantially parallel, generally flat, spaced apart ground portions; and a plurality of substantially one-half wavelength resonator assemblies positioned between said portions, each of said assemblies including a bar-like conductor having a substantially planar face adjacent to, and spaced from, a substantially planar face of an adjacent conductor to provide lumped capacitive coupling with the spacing therebetween determining the efficiency of the filter; a plurality of plates of dielectric support material, one of each secured to each one of said conductors; said plates being spaced apart from and oriented substantially parallel to each of said portions, each of said plates defining slot apertures near the lateral extremities of each plate with each aperture in each plate having a minor dimension suitable for encompassing a bolt for maintaining each plate in lateral position and a major dimension substantially greater than said minor dimension thereby facilitating longitudinal adjustment of each plate and assembly with the bolt in position; the filter being free of dielectric support material in regions between each of said conductors and said portions and in regions between said adjacent planar faces; each of said bar-like conductors of each said assembly containing a smaller cross-sectional area than the cross-sectional area in the region adjacent each planar face; said smaller cross-sectional area of said bar-like conductor extending substantially the length of its associated dielectric support plate.

References Cited in the file of this patent

UNITED STATES PATENTS

| | | |
|---|---|---|
| 2,798,206 | Baroch | July 2, 1957 |
| 2,867,782 | Arditi | Jan. 6, 1959 |

FOREIGN PATENTS

| | | |
|---|---|---|
| 513,258 | Belgium | Feb. 2, 1953 |

OTHER REFERENCES

Bradley and White: "Band-Pass Filters Using Strip-Line Techniques," Electronics, May 1955, pages 152–155.

Barrett: "Etched Sheets Serve as Microwave Components," Electronics, June 1952, pages 114–118.

Cohn: "Direct-Coupled-Resonator Filters," IRE Proceedings, vol. 45, No. 1, pages 187–211, February 1957.

Fubini et al.: Convention Record of the IRE, part 8, Communications and Microwave; 1954 National Convention, pages 91–97.

Michelson et al.; IRE Transactions on Microwave Theory and Techniques, volume MTT-3, March 1955, No. 2, pages 170–174.

UNITED STATES PATENT OFFICE

CERTIFICATE OF CORRECTION

May 17, 1960

Patent No. 2,937,347

George L. Matthaei et al.

It is hereby certified that error appears in the printed specification of the above numbered patent requiring correction and that the said Letters Patent should read as corrected below.

Column 4, lines 46 and 47, for "and said pairs" read -- said plates --.

Signed and sealed this 6th day of December 1960.

(SEAL)

Attest:

KARL H. AXLINE
Attesting Officer

ROBERT C. WATSON
Commissioner of Patents